(12) United States Patent
Nobushima et al.

(10) Patent No.: US 8,727,529 B2
(45) Date of Patent: May 20, 2014

(54) BARCODE PRINTING CONTROL DEVICE

(75) Inventors: Koichi Nobushima, Ibaraki (JP);
Junichi Hakamada, Ibaraki (JP);
Tsutomu Kurose, Ibaraki (JP);
Takahiko Nakamura, Ibaraki (JP);
Yoshiyuki Okada, Ibaraki (JP);
Mitsuaki Ishitoya, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 21 days.

(21) Appl. No.: 13/598,113

(22) Filed: Aug. 29, 2012

(65) Prior Publication Data

US 2013/0076848 A1 Mar. 28, 2013

(30) Foreign Application Priority Data

Sep. 27, 2011 (JP) .................................. 2011-210474

(51) Int. Cl.
*B41J 2/01* (2006.01)

(52) U.S. Cl.
USPC ........................................................ 347/107

(58) Field of Classification Search
None
See application file for complete search history.

(56) References Cited

U.S. PATENT DOCUMENTS 6,236,752 B1 * 5/2001 Katayama et al. ............ 382/183
8,235,516 B2 * 8/2012 Auslander et al. .............. 347/96

FOREIGN PATENT DOCUMENTS

JP 2003-136785 5/2003

* cited by examiner

*Primary Examiner* — Geoffrey Mruk
(74) *Attorney, Agent, or Firm* — Hamre, Schumann, Mueller & Larson, P.C.

(57) ABSTRACT

A printing device includes a barcode area dividing unit that divides a barcode area of a printing sheet into plural division areas along a Y direction, and a barcode area ejection amount conversion and output unit that controls an ink jet printing unit to print black bars such that an X direction is a direction in which the black bars and white bars are alternately arranged and occupancy dimensions of ink of pixels are different in the division areas divided by the barcode area dividing unit.

6 Claims, 8 Drawing Sheets

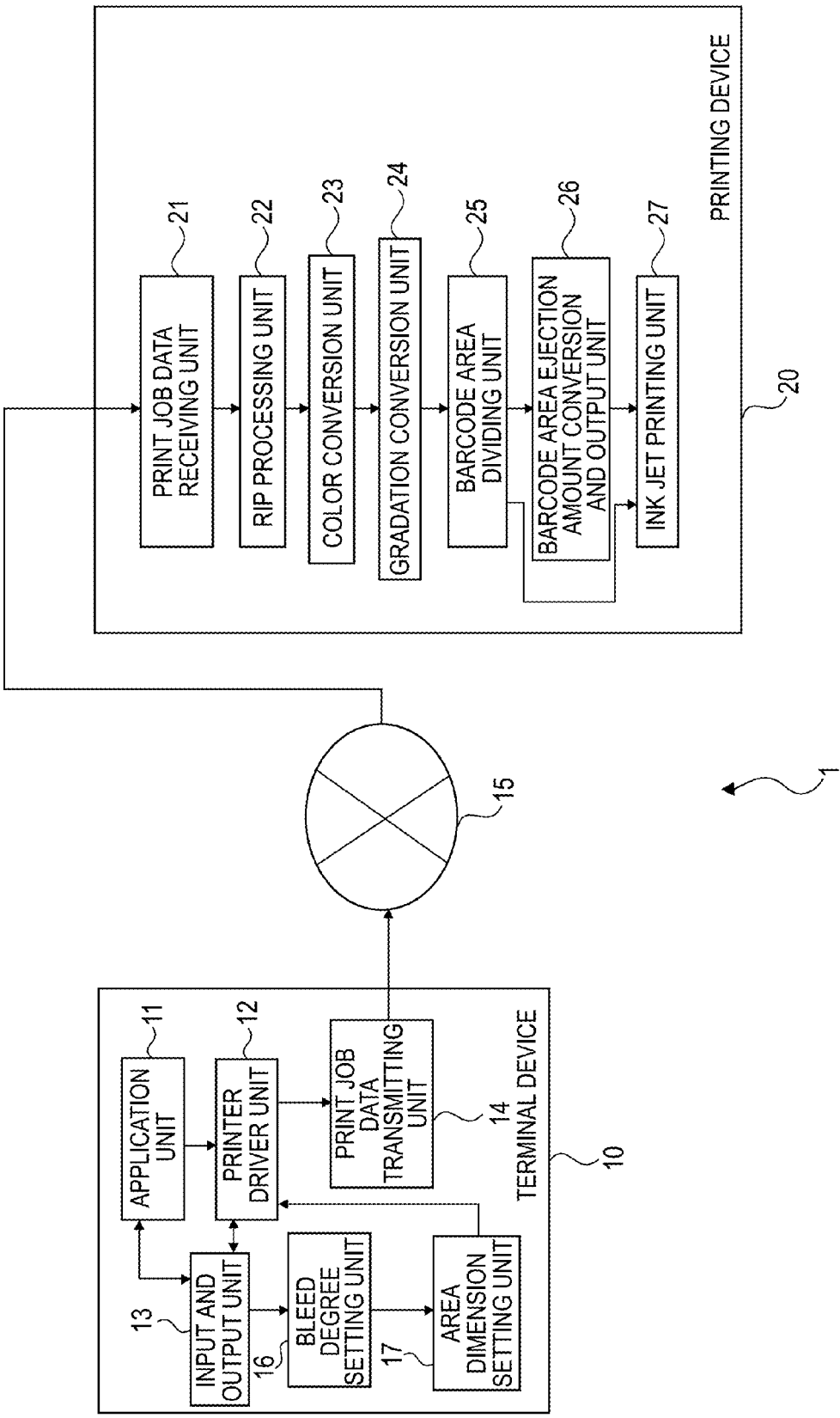

BARCODE PRINTING CONTROL DEVICE

BACKGROUND OF THE INVENTION

1. Field of the Invention

The present invention relates to a barcode printing control device which controls the printing of a barcode on a printing sheet using an ink.

2. Background Art

Generally, a barcode representing an identification code such as numerical values and characters by a stripe pattern formed of a combination of black bars and white bars is printed. The printed barcode is scanned by a barcode reader in a direction of the alternately arranged black bars and white bars, thereby reading the identification code represented by the barcode. In this case, the barcode may be read by scanning once or more on the basis of the printing quality of the barcode, resolution of the barcode reader, and a scanning direction of the barcode reader by a user, but there are cases where the barcode may not be read within a predetermined number of times.

There are many cases where the barcode is printed with another image (hereinafter, referred to as a document image) other than the barcode, such as characters. Dense printing of the document image causes the printing quality to be improved. Printing density of the barcode and printing density of the document image are collectively high such that there is no incompatibility of visibility between the printing density of the barcode and the printing density of the document image.

However, line widths of the black bars and the white bars of the barcode are strictly regulated. Accordingly, when thickening of characters of dots based on the bleed of the ink into the printing sheet occurs on the densely printed barcode, a reading rate of the barcode reader is decreased.

For this reason, as a technique in which a printing density is set high to improve the reading rate of the barcode when the thickening of the characters of the dots based on the bleed of the ink occurs, there is a technique disclosed in JP-A-2003-136785.

According to the technique disclosed in JP-A-2003-136785, a technique in which a logical multiply operation of data corresponding to the barcode and data obtained by shifting the data either left or right by one dot is performed to perform printing in the left and right directions by one dot is disclosed. As a result, even when the printing density is set high and the thickening of the characters of the dots based on the bleed of the ink occurs, it is possible to prevent the reading rate of the barcode from decreasing.

However, in the related prior art described above, there is the following problem. In the related prior art described above, one dot is uniformly reduced at the part of the black bars and the printing is performed, thereby suppressing the thickening of the black bars. However, according to properties of the ink and printing sheets, even when one dot is reduced and the printing is performed, the bleed of the ink of the dots is large. Accordingly, the thickening of the black bars is not sufficiently suppressed and thus there are cases where it is difficult to read the barcode.

Meanwhile, according to properties of the ink and printing sheets, there are cases where the bleed of the ink is small. In such a case, when the printing density is uniformly decreased as described in the related art, the widths of the black bars necessary for the barcode reading are not achieved, and there are cases where it is difficult to read the barcode.

SUMMARY OF THE INVENTION

An advantage of some aspects of the invention is to provide a printing control device capable of improving a reading rate of a barcode, irrespective of the bleed degree of the ink into the printing sheet.

According to an aspect of the invention, there is provided a barcode printing control device which controls a printing unit printing a printing target image having plural pixels on a printing sheet using ink to print a barcode in which a plurality of color bars and a plurality of white bars that are a white background among the color bars are alternately arranged, in a predetermined area of the printing sheet by a predetermined density or more, the barcode printing control device including: an area dividing unit that divides the predetermined area into at least two areas along a first direction; and a printing control unit that controls the printing unit to print the color bars such that a direction perpendicular to the first direction is a direction in which the color bars and the white bars are alternately arranged and occupancy dimensions of ink of pixels in the area are different in the areas divided by the area dividing unit.

The barcode printing control device may further include a bleed degree setting unit that sets a bleed degree of the ink into the printing sheet; and an area dimension setting unit that sets dimension of the areas according to the bleed degree set by the bleed degree setting unit.

According to the aspect of the invention, in the division areas in the barcode printing area, the occupancy dimensions of the ink of the pixels are changed from small to large for the color bars. As a result, in any area among the division areas, the width of the color bar becomes a readable proper width irrespective of the degree of bleed of the ink into the printing sheet, and thus it is possible to read the barcode when any area in the barcode printing area is scanned by the barcode reader.

According to another aspect of the invention, the dimensions of the division areas are set according to the bleed degree set by the bleed degree setting unit. For this reason, when the bleed degree is high, the dimension of the division area with the small occupancy dimension of the ink of the pixels is made large, and when the bleed degree is low, the dimension of the division area with the large occupancy dimension of the ink of the pixels is made large. Accordingly, the dimension of the division area in which the width of the color bar becomes a readable proper width becomes large. As a result, when any area in the barcode printing area is scanned by the barcode reader, it is possible to further improve the readability of the barcode.

BRIEF DESCRIPTION OF THE DRAWINGS

FIG. 8 is a block diagram illustrating a configuration of a printing system of a second embodiment.

DETAILED DESCRIPTION OF THE INVENTION

First Embodiment

Configuration of Printing System

Figure 1:
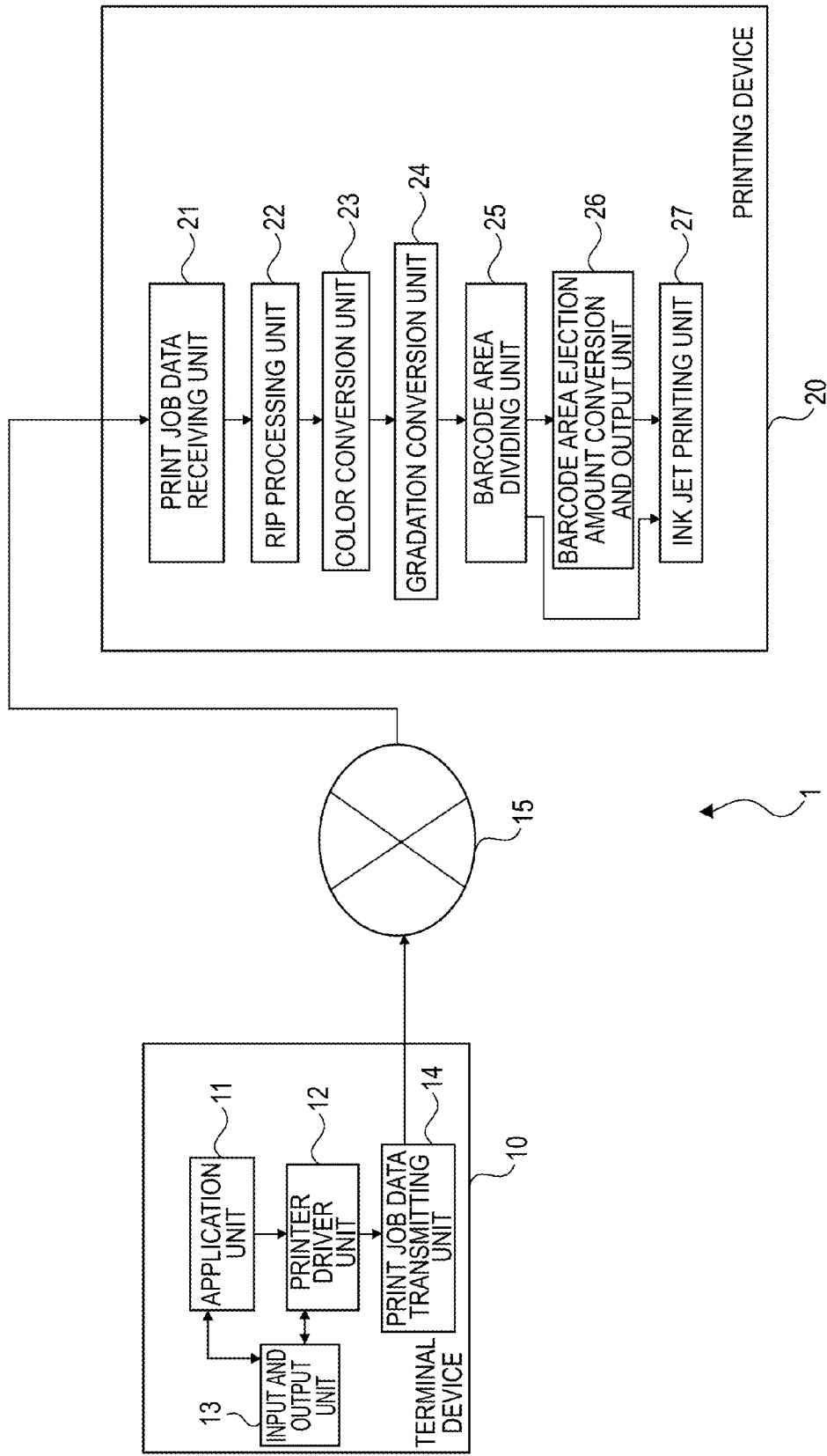
FIG. 1 is a block diagram illustrating a configuration of a printing system of a first embodiment.

As shown in FIG. 1, a printing system 1 is provided with an operation system for performing a basic operation such as a user interface, and is provided with a terminal device 10, which is provided with an operation system for performing a basic operation such as a user interface, capable of executing various kinds of software, a printing device 20, and a communication unit 15 connecting between them through a network such as wire LAN.

(Terminal Device)

The terminal device 10 is provided with an application unit 11, a printer driver unit 12, an input and output unit 13, and a print job data transmitting unit 14. The application unit 11 and the printer driver unit 12 are configured by performing a process such as reading by a CPU or the like on a program installed in the terminal device 10.

The application unit 11 is provided with a program generating document data representing a document image such as a document. The application unit 11 generates a barcode, which is included in the document data. The barcode is generated as follows to be readable by a barcode reader. In the barcode, as for black bars and white bars representing a white background among the black bars, there are two kinds of bars, thick width and thin width, and a ratio of the thick widths and thin widths is determined at a predetermined rate. A line width ratio of adjacent black bar width and white bar width is determined at a predetermined ratio.

To cause the black bars to be readable by the barcode reader, it is necessary to set a density of the black bars to be equal to or more than a predetermined threshold value. When ink is ejected from an ink jet printing unit 27 with a minimum number of drops to perform printing on a printing sheet as an example in the embodiment, the printed black bars are over the predetermined threshold value.

The application unit 11 disposes the barcode in a predetermined area of the document area and disposes the document image in the other area, to generate the document data. The document data is formed of the document image, the barcode, and information representing the areas thereof. The document data generated in the application unit 11 is output to the printer driver unit 12.

The printer driver unit 12 performs displaying such as a printing operation screen and a printing setting screen as an output function of the input and output unit 13, receives setting of printing from the user through an input function of the input and output unit 13, and reports setting information or a printing state about printing to the user through an output function of the input and output unit 13. The printer driver unit 12 generates print job data (for example, PDL data) on the basis of the information set by the user and the document data, and outputs the print job data to the printing device 20 through the print job data transmitting unit 14 and the communication unit 15 of the terminal device 10. In this case, the printing job data includes information (hereinafter, referred to as barcode area information) representing an area where the barcode is disposed, and information (hereinafter, referred to as document image area information) representing an area where the document image is disposed.

The input and output unit 13 has the input function and the output function. The input function is configured by a keyboard and the like, and the output function is configured by a liquid crystal display monitor and the like. The input and output unit 13 causes the user to input various kinds of data, and outputs the input data to the printer driver unit 12 or the application unit 11. The input and output unit 13 reports the output result from the printer driver unit 12 or the application unit 11 to the user. For example, the user performs setting to combine the black bars and the white bars with the thick width and the thin width constituting the barcode using the input and output unit 13 and to dispose the barcode in the predetermined area in the document area.

The setting information is transmitted to the application unit 11. The application unit 11 generates the barcode on the basis of the setting information, and the barcode is included in the document data. The print job data transmitting unit 14 transmits the print job data output from the printer driver unit 12 to the printing device 20 through the communication unit 15.

(Printing Device)

The printing device 20 includes a print job data receiving unit 21, an RIP processing unit 22, a color conversion unit 23, a gradation conversion unit 24, a barcode area dividing unit 25, a barcode area ejection amount conversion and output unit 26, and the ink jet printing unit 27. The printing job data receiving unit 21 receives the print job data transmitted from the print job data transmitting unit 14.

The RIP processing unit 22 generates development print job data that is a result of development to bitmaps at a predetermined resolution of a red (hereinafter, referred to as R) component, a green (hereinafter, referred to as G) component, and a blue (hereinafter, referred to as B) component on the basis of the print job data received by the print job data receiving unit 21. In the development print job data, a value of the R component (for example, 0 to 255), a value of the G component (for example, 0 to 255), and a value of the B component (for example, 0 to 255) may be associated with the pixels (pixels corresponding to coordinate positions in development print job data) developed to the predetermined resolution.

The RIP processing unit 22 acquires the coordinate position (barcode corresponding coordinate position) corresponding to the area where the barcode is disposed on the basis of the barcode area information and acquires each coordinate position (document image corresponding coordinate position) corresponding to the area where the document image is disposed on the basis of the document image area information.

The color conversion unit 23 converts the development print job data of the R component, the G component, and the B component generated by the RIP processing unit 22 into development print job data including a cyan (hereinafter, referred to as C) component, a magenta (hereinafter, referred to as M) component, a yellow (hereinafter, referred to as Y) component, and a black (hereinafter, referred to as K) component. In the development print job data, a value of the C component (for example, 0 to 255), a value of the M component (for example, 0 to 255), a value of the Y component (for example, 0 to 255), and a value of the K component (for example, 0 to 255) may be associated with the coordinate positions developed to the predetermined resolution.

The gradation conversion unit 24 converts the development print job data of the C component, the M component, the Y component, and the K component converted by the color conversion unit 23 into ejection image data with a small number of gradations from the number of gradations of the development print job data. Specifically, the gradation conversion unit 24 performs, for example, a multi-value error diffusion process on the development print job data of the C to K components generated in the color conversion unit, and generates the ejection image data printable in the ink jet printing unit 27. The ejection image data represents the number of ejection drops of the color inks ejected from the ink jet head to the pixels (coordinate positions (x, y)). The number of ejection drops is set to eight stages of 0 to 7 drops as an example, but may be stages of a different number of two or more. The gradation conversion unit 24 outputs the ejection image data to the barcode area dividing unit 25.

Figure 4:
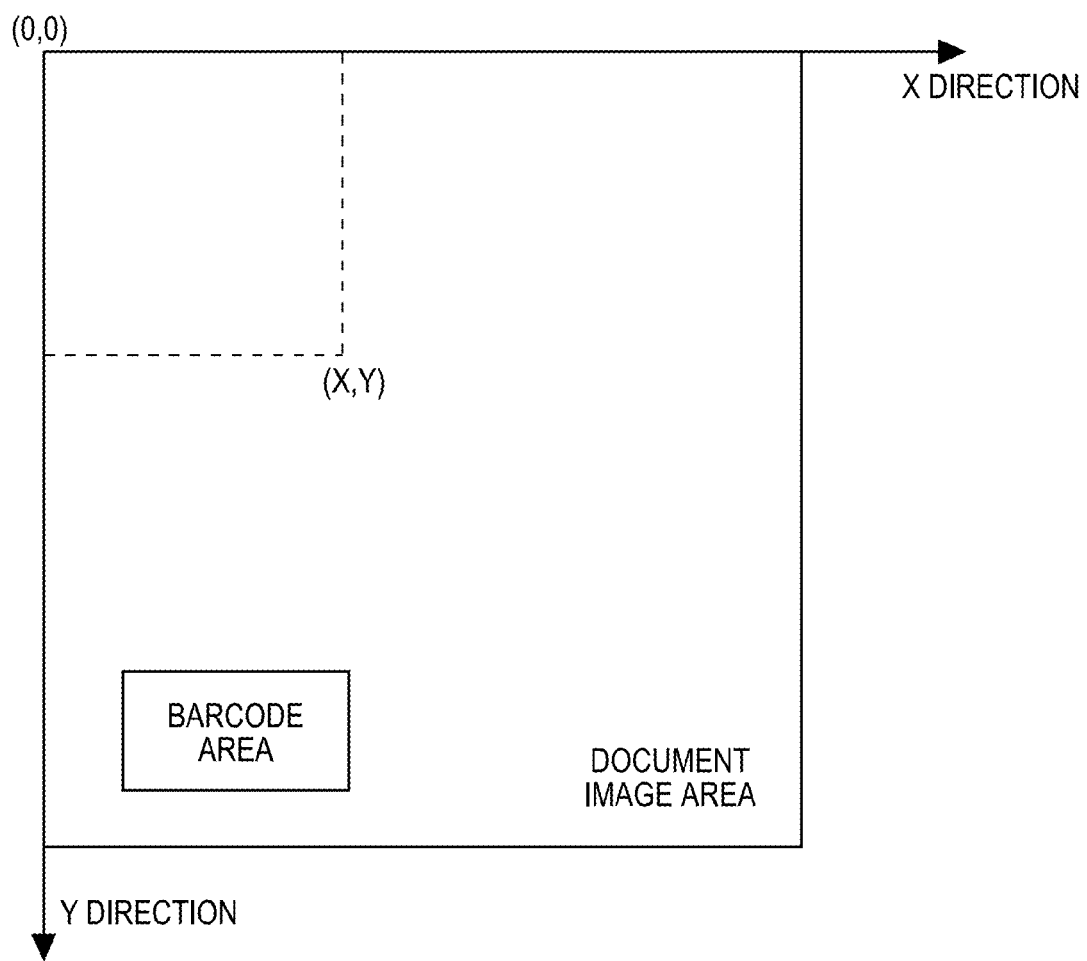
FIG. 4 is a diagram illustrating a method of setting coordinates of a document image area and a barcode area of the first embodiment.
Figure 5:
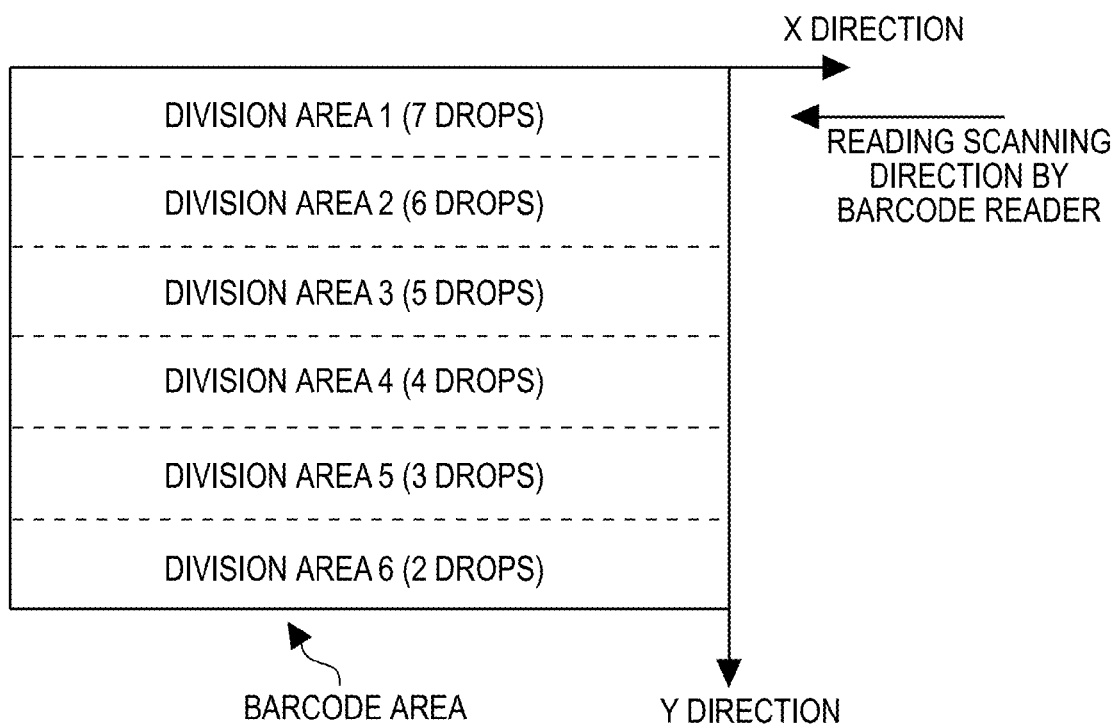
FIG. 5 is a diagram illustrating a process of dividing the barcode area of the first embodiment.

The barcode area dividing unit 25 divides a predetermined area in the printing sheet into at least two division areas along a first direction perpendicular to the X-direction or the barcode direction in FIGS. 4 and 5. Detailed description of the process will be described later. The barcode area dividing unit 25 determines the areas where the document image and the barcode are disposed, in the document data, and outputs the ejection image data (the number of ejection drops of the coordinate positions of the document image part (the number of ejection drops of the C component to the K components)) to the ink jet printing unit 27, and outputs the ejection image data (the number of ejection drops of the coordinate positions of the barcode part (the number of ejection drops of the C component to the K component)) to the barcode area ejection amount conversion and output unit 26.

The barcode area ejection amount conversion and output unit 26 causes the ink jet printing unit 27 to perform printing of the black bars such that a direction perpendicular to the first direction is a direction in which the black bars and the white bars are alternately arranged and the occupancy dimensions of the ink of the pixels in the division areas are different in the division areas divided by the barcode area dividing unit 25. Detailed description of the process will be described later. The barcode area ejection amount conversion and output unit 26 outputs the processed ejection image data (the number of ejection drops of the coordinate positions of the barcode part) to the ink jet printing unit 27.

The ink jet printing unit 27 includes ejection heads corresponding to the C component value, the M component value, the Y component value, and the K component value. The ink jet printing unit 27 includes a feed and discharge unit that feeds the printing sheet and discharges the printed sheet after performing the ejection operation by the ejection head. The ink jet printing unit 27 controls an ink ejection control of the ejection heads to form the image of the document data in a predetermined position on the printing sheet fed from the feeding unit, on the basis of the ejection drop value of the C component, the ejection drop value of the M component, the ejection drop value of the Y component, and the ejection drop value of the K component for the coordinate positions of the ejection image data output by the barcode area dividing unit 25 and the barcode area ejection amount conversion and output unit 26.

Specifically, the ink jet printing unit 27 performs the printing process on the printing sheet on the basis of the ejection image data (document image part) output by the barcode area dividing unit 25 and the ejection image data (barcode part) output by the barcode area ejection amount conversion and output unit 26. That is, the ink jet printing unit 27 prints the document image on the printing sheet on the basis of the ejection image data corresponding to the document image corresponding coordinate positions. The ink jet printing unit 27 prints the barcode on the printing sheet on the basis of the ejection image data (the number of ejection drops of the coordinate positions) corresponding to the division areas 1 to 6 converted by the barcode area ejection amount conversion and output unit 26.

[Printing Method]

Figure 2:
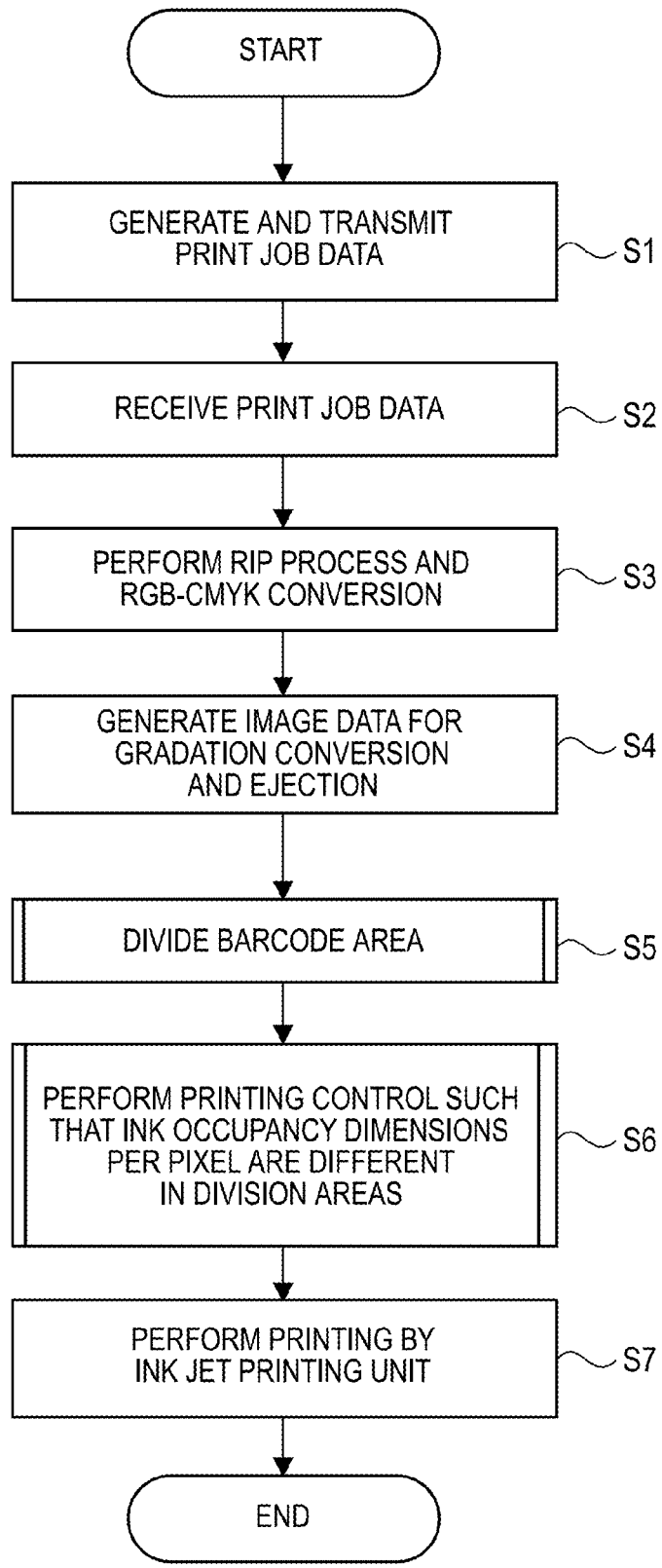
FIG. 2 is a flowchart illustrating a printing method of the first embodiment.

Next, a printing method using the printing system described above will be described using the flowchart shown in FIG. 2.

In the terminal device 10, the printing job data is generated, and then is transmitted to the printing device 20 (S1). Specifically, the document data including the barcode is generated by the application unit 11.

In the document data, the barcode is generated such that a direction in which the black bars and the white bars are alternately arranged is a horizontal direction (X direction shown in FIG. 4) and the widths of the black bars and the white bars are the two kinds: thick width and thin width.

The printer driver unit 12 generates the print job data from the information input on the basis of the displaying of the printing setting screen or the like, and the document data. The print job data transmitting unit 14 transmits the print job data to the printing device 20 through the communication unit 15.

When the print job data receiving unit 21 of the printing device 20 receives the transmitted print job data (S2), the print job data is transmitted to the RIP processing unit 22.

The RIP processing unit 22 performs the RIP process, and then the color conversion unit 23 performs RGB-CMYK conversion (S3). Specifically, the RIP processing unit 22 develops the R component, the G component, and the B component to bitmaps at a predetermined resolution on the basis of the print job data to generate the development print job data. The color conversion unit 23 converts the development print job data of the R component, the G component, and the B component generated in the RIP processing unit 22 into the development print job data including the C component, the M component, the Y component, and the K component.

The gradation conversion unit 24 converts the development print job data of the C component, the M component, the Y component, and the K component converted by the color conversion unit 23, from 256 gradations to 8 gradations, to generate the ejection image data (S4).

The barcode area dividing unit 25 equally divides the area where the barcode is disposed (hereinafter, referred to as a barcode area) into six division areas along the Y-axis direction shown in FIG. 4 on the basis of the ejection image data (S5). Detailed description of the process will be described later.

The barcode area ejection conversion and output unit 26 causes the ink jet printing unit 27 to perform printing of the black bars such that the X direction (or barcode direction) is the direction in which the black bars and the white bars are alternately arranged and the occupancy dimensions of the ink of the pixels in the division areas are different in the division areas divided by the barcode area dividing unit 25 (S6). Detailed description of the process will be described later.

The ink jet printing unit 27 performs a printing process on the printing sheet on the basis of the ejection image data converted by the gradation conversion unit 24 and the data output by the barcode area ejection amount conversion and output unit 26, to output a print (S7).

Figure 3:
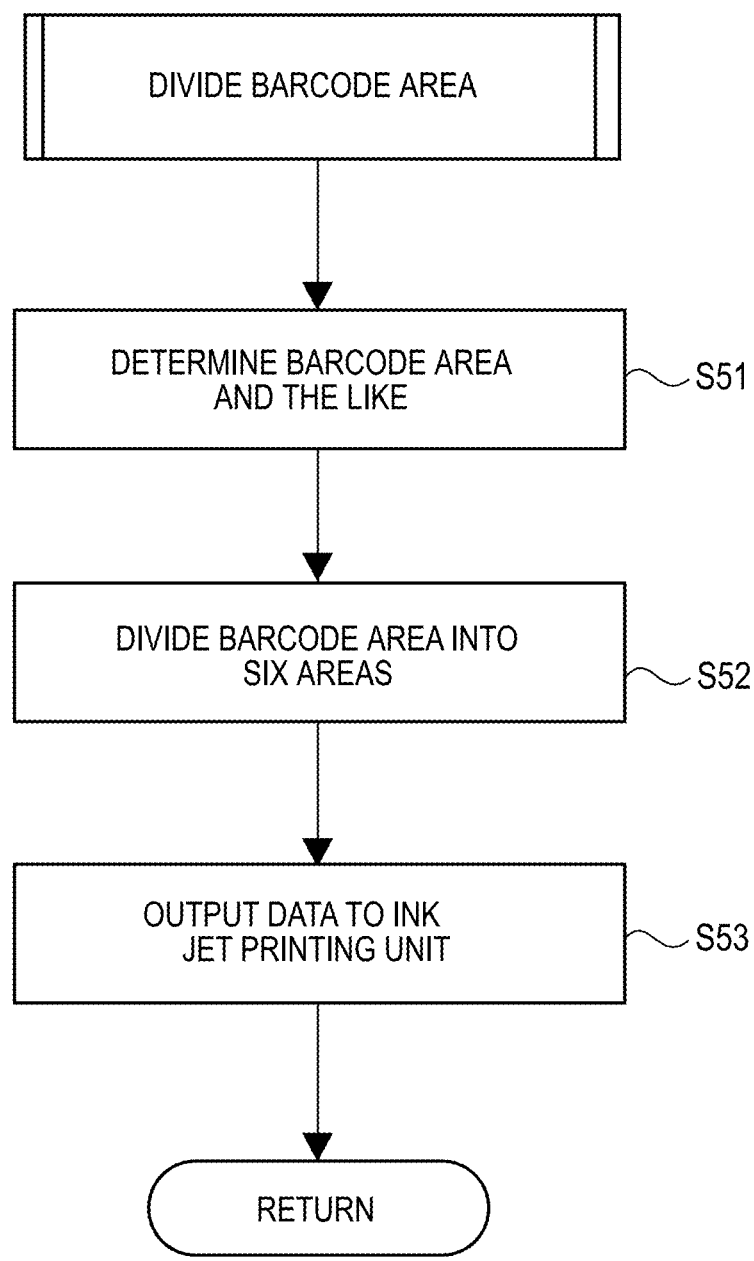
FIG. 3 is a flowchart illustrating a barcode area dividing process of the first embodiment.

Next, the area dividing process by the barcode area dividing unit 25 will be described in detail using the flowchart shown in FIG. 3.

The barcode area dividing unit 25 determines the area where the barcode is disposed, in the document data, on the basis of the barcode corresponding coordinate position acquired by the RIP processing unit 22, and determines the area where the document image is disposed, in the document data, on the basis of the document image corresponding coordinate position (S51).

For example, the barcode area dividing unit 25 acquires the coordinate positions assigned in which a predetermined position is an origin, for the pixels of the whole area of the document data, as shown in FIG. 4, on the basis of the barcode corresponding coordinate position and the document image corresponding coordinate position, which are transmitted from the RIP processing unit. The barcode area dividing unit 25 determines the area where the barcode is printed, on the basis of the barcode corresponding coordinate position, and determines the area where the document image is printed, on the basis of the document image corresponding coordinate position.

In the barcode area dividing unit 25, the area where the barcode is disposed (hereinafter, referred to as a barcode area) is divided into six areas along the Y-axis direction (S52). For example, as shown in FIG. 5, the barcode area dividing unit 25 performs a process of division into six areas by association with information representing the division areas 1 to 6 at the coordinate positions of the division areas 1 to 6 of the coordinate positions corresponding to the barcode corresponding coordinate positions. Herein, in the division of six areas, dimensions of the divided area are substantially the same.

The barcode area dividing unit 25 transmits the data (hereinafter, referred to as barcode ejection drop number data) representing the number of ejection drops of the coordinate positions corresponding to the division areas 1 to 6 to the barcode area ejection amount conversion and output unit 26, and outputs the data representing the number of ejection drops of the coordinate positions corresponding to the area in which it is determined that the document image is disposed, to the ink jet printing unit 27 (S53).

Figure 6:
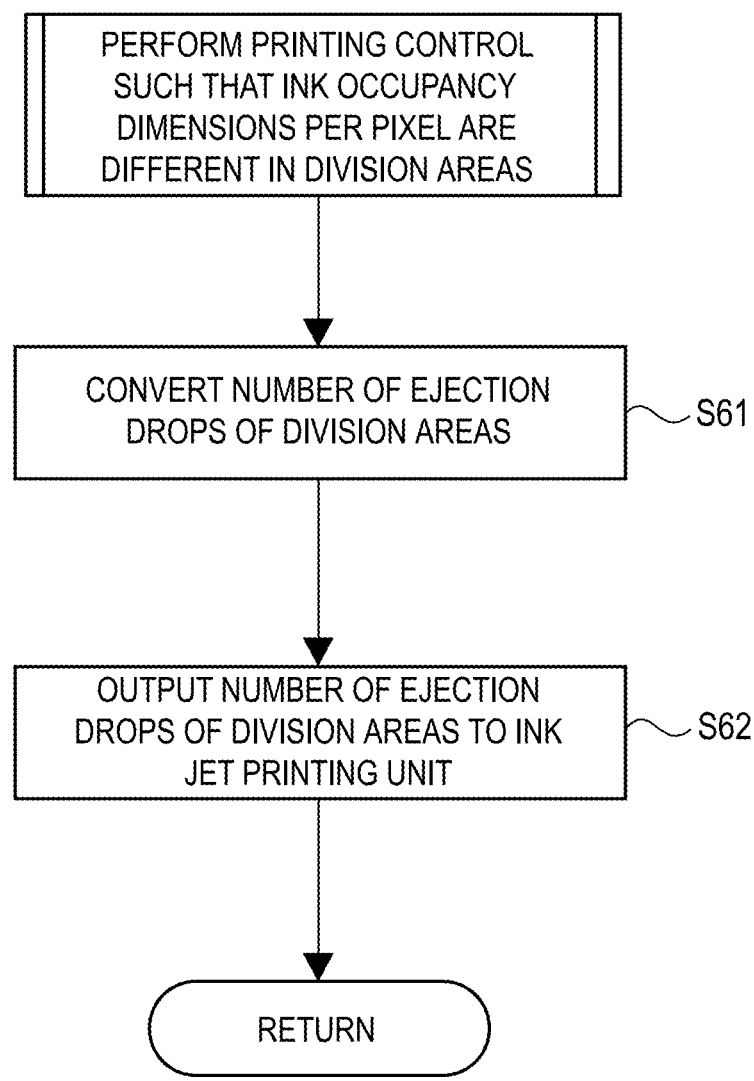
FIG. 6 is a flowchart illustrating a printing control of the divided areas of the first embodiment.

Next, the ejection amount conversion and output process by the barcode area ejection amount conversion and output unit 26 will be described in detail using the flowchart shown in FIG. 6.

The barcode area ejection amount conversion and output unit 26 changes the number of ejection drops corresponding to the pixels (coordinate positions) constituting the black bars included in the division areas 1 to 6 on the basis of the barcode ejection drop number data, to the number of ejection drops of 7 to 2 (S61).

The barcode ejection drop number data includes information representing the direction in which the black bars and the white bars are alternately arranged in the X direction and the widths, thick width and thin width, of the black bars and the white bars.

The barcode area ejection amount conversion and output unit 26 uniformly converts the ejection drop amount of all the coordinate positions corresponding to the division area 1, into the number of drops of 7. Similarly, the barcode area dividing unit 25 uniformly converts the ejection drop amount of all the coordinate positions corresponding to the division areas 2 to 6, into the number of drops of 6 to 2.

In this case, the barcode area ejection amount conversion and output unit 26 converts the ejection drop amount (C component, M component, Y component, and K component) of all the coordinate positions corresponding to the division areas, into the ejection drop amount of only K component (conversion into pure black).

However, the barcode area ejection amount conversion and output unit 26 may convert the ejection drop amount (C component, M component, Y component, and K component) of all the coordinate positions corresponding to the division areas, into the ejection drop amount of a composite component (C component, M component, Y component, and K component, or C component, M component, and Y component). The barcode area ejection amount conversion and output unit 26 may convert the ejection drop amount (pure black of only K component) of all the coordinate positions corresponding to the division areas, into the drop amount of the composite component. Any conversion may be selected according to the remaining amount of the K component of ink.

The barcode area ejection amount conversion and output unit 26 outputs the data representing the number of ejection drops of the coordinate positions corresponding to the division areas 1 to 6 subjected to the ejection drop number conversion, to the ink jet printing unit 27 (S62).

[Barcode Reading Process]

A process of reading the barcode printed by the ink jet printing unit 27 as described above by a barcode reader (not shown) will be described hereinafter.

The barcode reader is operated in manual scanning manner, and is formed of an LED light source, a photodiode, and the like. When the barcode is read and scanned by moving the barcode reader, light is irradiated from the LED light source, and light reflected from the black bars or the white bars of the barcode is received by the photodiode, thereby acquiring barcode information. The barcode reader itself may determine whether or not it is possible to read the barcode information according to a scanning speed, a scanning angle, a reading performance, and a ratio of thick width and thin width constituting the printed barcode, and it may be determined by a dedicated terminal by connecting the barcode reader to the dedicated terminal such as a PC.

Using the barcode reader configured as described above, the scanning of the barcode reader is performed in the direction in which the black bars and the white bars are alternately arranged in the barcode-printed area on the barcode-printed print. The scanning is performed while variously changing the scanning parts of the barcode until it is possible to read the barcode information. The configuration of the barcode, the reading method, and the method of determining whether or not reading are the known methods, and the details thereof are not described.

Figure 7:
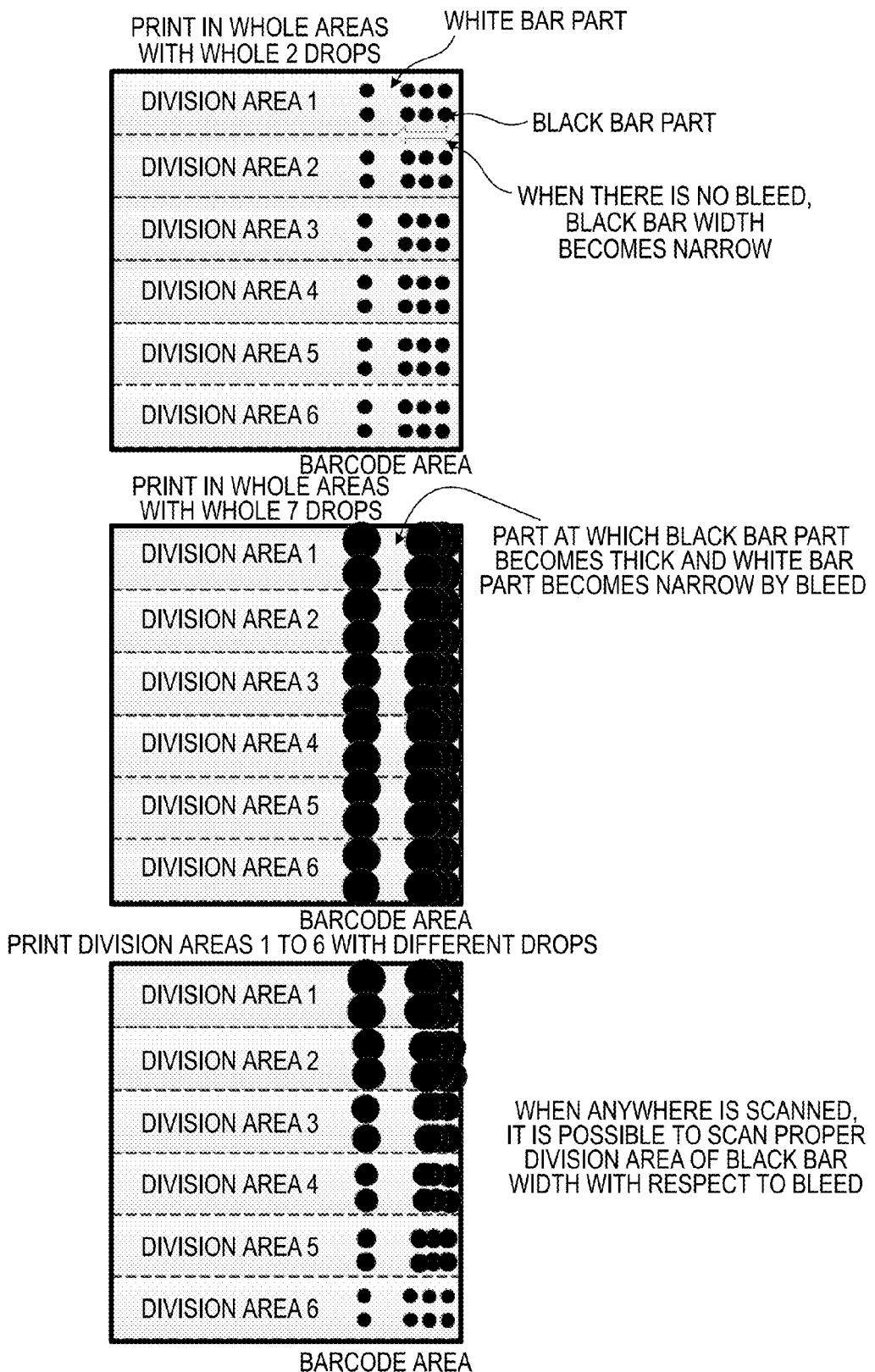
FIG. 7 is a diagram illustrating that a reading rate of a barcode is improved when printing is performed with the number of ejection drops different stepwise for each divided area.

FIG. 7 is a schematic diagram illustrating that a reading rate of the barcode is improved when printing is performed with different numbers of ejection drops stepwise for the division areas, as compared with the case of printing the barcode area with a fixed number of ejection drops.

When the printing is performed such that the occupancy dimensions of the ink of the pixels are different stepwise for each division area (for example, phenomenon such as difference of dot gain), the widths of the black bars are different for each division area. Herein, as an example thereof, the case of performing the printing with the different numbers of ejection drops stepwise for each division area will be described.

As described above, in the terminal device 10, the barcode readable by the barcode reader is generated, and thus the printed barcode is readable by the barcode reader. However, the bleed degree of the ink to the printing sheet changes according to ink and printing sheets used in the printing. For this reason, there are cases where the widths of the black bars of the barcode become larger (thickening of characters) or smaller than a predetermined readable width according to the bleed degree.

In such a case, when the number of ejection drops for printing the barcode area is fixed, the widths of the black bars are proper with respect to a predetermined bleed degree, but may not be proper with respect to the other bleed degree. In the embodiment, the printing is performed with the different numbers of ejection drops stepwise for each division area to solve the problem described above.

When the print on which all the black bars of the barcode are printed with 2 drops is read by the barcode reader as described above and the bleed degree of the ink to the printing sheet is large, the widths of the black bars are a proper width, and it is possible to read the barcode. However, when the bleed degree of the ink to the printing sheet is very small, the widths of the black bars may be smaller than the proper width. In such a case, it is difficult to read the barcode.

When the print on which all the black bars of the barcode are printed with 7 drops is read by the barcode reader as described above and the bleed degree of the ink to the printing sheet is small, the widths of the black bars are the proper width, and it is possible to read the barcode. However, when the bleed degree of the ink to the printing sheet is large, the widths of the black bars may be larger than the proper width by the thickening of the characters. In such a case, it is difficult to read the barcode.

When the print on which all the black bars of the barcode are printed with 3 to 6 (for example, 4 or 5) drops is read by the barcode reader as described above and the bleed degree of the ink to the printing sheet is substantially medium, the widths of the black bars are the proper width, and it is possible to read the barcode. However, when the bleed degree of the ink to the printing sheet is large or small, the widths of the black bars may not be the proper width by the thickening of the characters. In such a case, it is difficult to read the barcode.

In the embodiment, in the division areas 1 to 6 in the barcode area, the printing is performed with the number of ejection drops of 7 to 2. Accordingly, when the bleed degree to the printing sheet is large and the division areas (the area where the widths of the black bars are the proper width) printed with a small number of ejection drops is scanned, it is possible to read the barcode. When the bleed degree to the printing sheet is small and the division areas (the area where the widths of the black bars are the proper width) printed with a large number of ejection drops is scanned, it is possible to read the barcode. When the bleed degree to the printing sheet is substantially medium and the division areas (the area where the widths of the black bars are the proper width) printed with a medium number of ejection drops is scanned, it is possible to read the barcode.

As described above, in the area where the barcode is printed, when the number of ejection drops is fixed and the black bars are printed and even when any area is scanned by the barcode reader, there is a case of decreasing the reading rate according to the bleed of the ink to the printing sheet. In the embodiment, the number of ejection drops is changed from small to large and the black bars are printed in the area in which the barcode is printed and even when the bleed degree of the ink to the printing sheet is changed, and when any division area is scanned by the barcode reader, the readability of the barcode is raised.

(Operation Effect)

According to the embodiment, the barcode area dividing unit 25 that divides the barcode area of the printing sheet into the plural areas along the Y direction, and the barcode area ejection amount conversion and output unit 26 that controls the ink jet printing unit 27 to print the black bars such that the X direction is the direction in which the black bars and white bars are alternately arranged and the occupancy dimensions of the ink of the pixels are different in the division areas divided by the barcode area dividing unit 25.

The widths of the color bars become the proper readable width in any area of the division areas, irrespective of the degree of the bleed of the ink into the printing sheet. Accordingly, when any area in the barcode printing area is scanned by the barcode reader, it is possible to read the barcode. Accordingly, it is possible to improve the reading rate of the barcode, irrespective of the bleed degree of the ink to the printing sheet.

For example, when the barcode is printed by an ink jet printer, the widths of the black bars become narrow by ejection failure of a predetermined ejection nozzle or the like. In such a case, when the ejection failure nozzle is detected, a cost for the detection is necessary. For this reason, it is preferable to cope with the inconvenience described above without an ejection failure nozzle detecting mechanism.

In the embodiment, even when the ejection failure nozzle occurs, for example, the thickening of the characters occurs as much as the width-reduced part of the black bars can be embedded at the adjacent dot part in the division area with a large number of ejection drops. For this reason, the division area causing the thickening of the characters, as much as the widths of the black bars are readable and the width-reduced parts of the black bars can be embedded by the adjacent dots, is scanned, and thus it is possible to read the barcode.

Second Embodiment

FIG. 8 is a diagram illustrating a configuration of a printing system of the embodiment. In the embodiment, the description of the same configuration and same process as those of the first embodiment is not repeated or is simplified by attaching the same reference numerals and signs.

[Configuration of Printing System]

In the embodiment, as shown in FIG. 8, the terminal device 10 includes a bleed degree setting unit 16 that sets a bleed degree of ink to a printing sheet when black bars are printed on the printing sheet using the ink by the ink jet printing unit 27. The bleed degree setting unit 16 has a bleed degree corresponding table in which kinds of sheets (for example, matte paper, normal paper, thick paper, and thin paper) and kinds of inks (for example, aqueous and oily) are associated with the bleed degree of the ink to the printing sheet (for example, integers of 1 to 3).

The terminal device 10 includes an area dimension setting unit 17 that sets dimensions of division areas according to the bleed degree set by the bleed degree setting unit 16. The area dimension setting unit 17 has an area dimension corresponding table in which the bleed degrees are associated with dimension information of the division areas 1 to 6. The dimension information is represented by (the number of pixels in the X direction)×(the number of pixels in the Y direction). In the area dimension corresponding table, a range of coordinate positions in the X and Y directions is represented corresponding to (the number of pixels in the X direction)×(the number of pixels in the Y direction). For example, in the area dimension corresponding table, the bleed degrees (for example, 1 to 3, the larger number, the higher bleed degree) are associated with the dimension information (the range of 1 to 3 of the coordinate positions) of the division areas 1 to 3.

Herein, for example, for a bleed degree of 1, the dimension 1 (7 drops) of the division area:the dimension 2 (6 drops) of the division area:the dimension 3 (5 drops) of the division area:the dimension 4 (4 drops) of the division area:the dimension 5 (3 drops) of the division area:the dimension 6 (2 drops) of the division area is set to be 30:30:20:15:5:0.

For example, for a bleed degree of 2, the dimension 1 (7 drops) of the division area:the dimension 2 (6 drops) of the division area:the dimension 3 (5 drops) of the division area:the dimension 4 (4 drops) of the division area:the dimension 5 (3 drops) of the division area:the dimension 6 (2 drops) of the division area is set to be 1:1:1:1:1:1.

For example, for a bleed degree of 3, the dimension 1 (7 drops) of the division area:the dimension 2 (6 drops) of the division area:the dimension 3 (5 drops) of the division area: the dimension 4 (4 drops) of the division area:the dimension 5 (3 drops) of the division area:the dimension 6 (2 drops) of the division area is set to be 0:10:20:20:25:25.

[Printing Method]

In the flowcharts shown in FIG. 2, FIG. 3, and FIG. 6, processes different from the processes described in the first embodiment will be described in detail.

In Step S1, the following process is performed. When the kind of sheet and the kind of ink are input to the input and output unit 13 by the user, they are transmitted to the bleed degree setting unit 16.

The bleed degree setting unit 16 acquires the bleed degree corresponding to the input kind of sheet and kind of ink with reference to the bleed degree corresponding table. The bleed degree setting unit transmits the acquired bleed degree to the area dimension setting unit 17.

The area dimension setting unit 17 acquires dimension information of the division areas 1 to 6 corresponding to the transmitted bleed degree with reference to the area dimension corresponding table. Specifically, the area dimension setting unit 17 transmits the dimension information (the coordinate position range of the division area 1, the coordinate position range of the division area 2, the coordinate position range of the division area 3, . . . ) of the division areas formed by dividing the barcode area along the Y direction to the printer driver unit 12 on the basis of the acquired dimension information.

When the generated document data includes the dimension information of the division areas, the printer driver unit 12 includes the dimension information in the print job data and the ejection image data.

In Step S52, the following process is performed. In the barcode area dividing unit 25, the following area division is performed unlike the area division of the first embodiment. For example, the barcode area dividing unit 25 associates the information representing the division areas 1 to 6 with the coordinate positions in the division areas 1 to 6 of the coordinate positions corresponding to the barcode corresponding coordinate positions on the basis of the dimension information of the division areas, to perform the process of division into six areas. Herein, the division into six areas is performed as follows.

For the bleed degree of 1, the dimensions of the division areas 4 to 6 (2 drops to 4 drops) with a relatively small number of ejection drops become narrow, and the dimensions of the division areas 1 to 3 (5 drops to 7 drops) with a relatively large number of ejection drops become wide.

For the bleed degree of 2, the dimensions of the division areas are the same. For the bleed degree of 3, the dimensions of the division areas 5 to 6 (2 drops to 3 drops) with a small number of ejection drops become wide, and the dimensions of the division areas 1 to 2 (6 drops to 7 drops) with a large number of ejection drops become narrow. A method of changing the dimension of the division areas according to the bleed degree in the embodiment is an example, and various methods of changing the dimensions may be used as long as the characteristics of the embodiment are kept.

(Operation Effect)

According to the embodiment, when the black bars are printed on the printing sheet using the ink by the ink jet printing unit 27, the bleed degree setting unit 16 that sets the bleed degree of the ink to the printing sheet and the area dimension setting unit 17 that sets the dimensions of the division areas according to the set bleed degree are provided. Accordingly, the following operation effect is obtained in addition to the operation effect of the first embodiment.

When the bleed degree is high, the dimension of the division area with a small number of ejection drops is large. When the bleed degree is low, the dimension of the division area with a large number of ejection drops is large. Accordingly, the dimension of the division area in which the widths of the black bars are the proper readable width becomes large. As a result, when any area in the barcode printing area is scanned by the barcode reader, it is possible to further improve the readability of the barcode.

Modified Examples of Embodiments

In the embodiments described above, the case of printing the black bars has been described, but the invention is not limited thereto, and may be similarly applied to a case where color bars other than black configured by other colors are printed instead of the black bars.

In the embodiments described above, the barcode area dividing unit 25 divides the barcode area into six areas, but it is not limited to six parts, and the number of divisions may be any number equal to or more than two. By dividing the barcode area into small areas (for example, division of each 1 mm), it is possible to be equivalent to the case where all the black bars of the barcode area in external appearance as the barcode image are printed with the fixed drops.

In the embodiments described above, the minimum number of drops for performing the barcode printing is two. For example, when the ink jet printing unit 27 has a belt transport mechanism that transports the printing sheet while adsorbing the printing sheet and a configuration in which the printing is performed by ejecting the number of drops according to a print job on the printing sheet transported by the belt transport mechanism using the inks of the C component, the M component, the Y component, and the K component, the following may be applied.

That is, the minimum number of drops may be determined according to absorption force based on the belt transport mechanism. When the ink is ejected onto the printing sheet on the belt transport mechanism, there are cases where the printing position deviates by wind based on the absorption force in the drops of the small amount of ink (for example, 1 or 2 dots). For this reason, for example, in a case of first predetermined absorption force or more, the minimum number of drops may be three, and in a case less than the first predetermined absorption force and equal to or more than second predetermined absorption force, the minimum number of drops may be two.

In the embodiment, the case of including the document image and the barcode as the print job has been described, but the invention is not limited thereto, and may be applied to a case of including one or more barcodes as the print job. In this case, in the embodiments described above, the processes about the document image may be omitted, and the processes about the barcodes may be repeated once or more.

In the embodiments, the number of ejection drops of the black bars in the division areas is changed such that the occupancy dimensions of the ink to the pixels in the division areas are different, but a density of an edge portion of a one-side end portion and both-side end portions of the barcode may be changed stepwise.

In the embodiments, the printing device 20 is provided with the RIP processing unit 22, the gradation conversion unit 24, the barcode area dividing unit 25, and the barcode area ejection amount conversion and output unit 26, but is not limited thereto, and the printer driver of the terminal device 10 may be provided with the RIP processing unit 22, the gradation conversion unit 24, the barcode area dividing unit 25, and the barcode area ejection amount conversion and output unit 26.

The ejection image data (the ejection image data of the document image part and the ejection drop number data corresponding to the division areas of the barcode part) output from the printer driver is included in the print job data, and is transmitted to the printing device through the communication unit, and the printing device may perform the printing process on the basis of the transmitted print job data.

The terminal device 10 is provided with the bleed degree setting unit 16 and the area dimension setting unit 17, but is not limited thereto, and the printing device 20 may be provided with them.

The barcode includes a start character, data, a check digit, a stop character. When the barcode is read by the barcode reader, it may be determined that the barcode is readable as the barcode data when the data is read, then the check digit is checked, and the check digit is valid.

In the first embodiment, the ink jet printer is used as the printing device 20, but the invention is not limited thereto. That is, the same may be similarly applied to a printing device that performs printing using ink and a printing mechanism in which the ink bleeds to printing sheet.

The invention is defined by the claims. The invention is not limited to the abovementioned examples and the drawings disclosed in the illustrative embodiments. It is clearly possible to make various modifications and additions to these examples and to apply to various other alternative embodiments.

What is claimed is:

1. A barcode printing control device which controls a printing unit configured to print a barcode on a predetermined area of a printing sheet using ink, the barcode having a plurality of color bars and a plurality of white bars that are alternately arranged in a barcode scanning direction, the barcode printing control device comprising:

an area dividing unit that divides the predetermined area into at least two areas along a first direction perpendicular to the barcode scanning direction; and a printing control unit that controls the printing unit to print the color bars such that each occupancy dimension of ink of pixels forming the color bars in the at least two areas divided by the area dividing unit are different.

2. The barcode printing control device according to claim 1, further comprising:

a bleed degree setting unit that sets a bleed degree of the ink into the printing sheet; and an area dimension setting unit that sets dimension of the at least two areas according to the bleed degree set by the bleed degree setting unit.

3. The barcode printing control device according to claim 2, wherein the bleed degree setting unit includes a table listing kinds of printing sheets and kinds of inks.

4. The barcode printing control device according to claim 1, wherein areas of the at least two areas divided by the area dividing unit are equal.

5. The barcode printing control device according to claim 1, wherein the area dividing unit outputs barcode ejection drop number data for each of the at least two areas, and the printing unit prints each of the color bars on the at least two areas based on the barcode ejection drop number data.

6. The barcode printing control device according to claim 5 further comprising a barcode area ejection amount conversion unit that converts the barcode ejection drop number data so as to correspond to the pixels on coordinate positions on the printing sheet.

\* \* \* \* \*